Z. HOGAN.
SWITCH OPERATING MEANS.
APPLICATION FILED SEPT. 12, 1916.
1,257,233.
Patented Feb. 19, 1918.
3 SHEETS—SHEET 1.
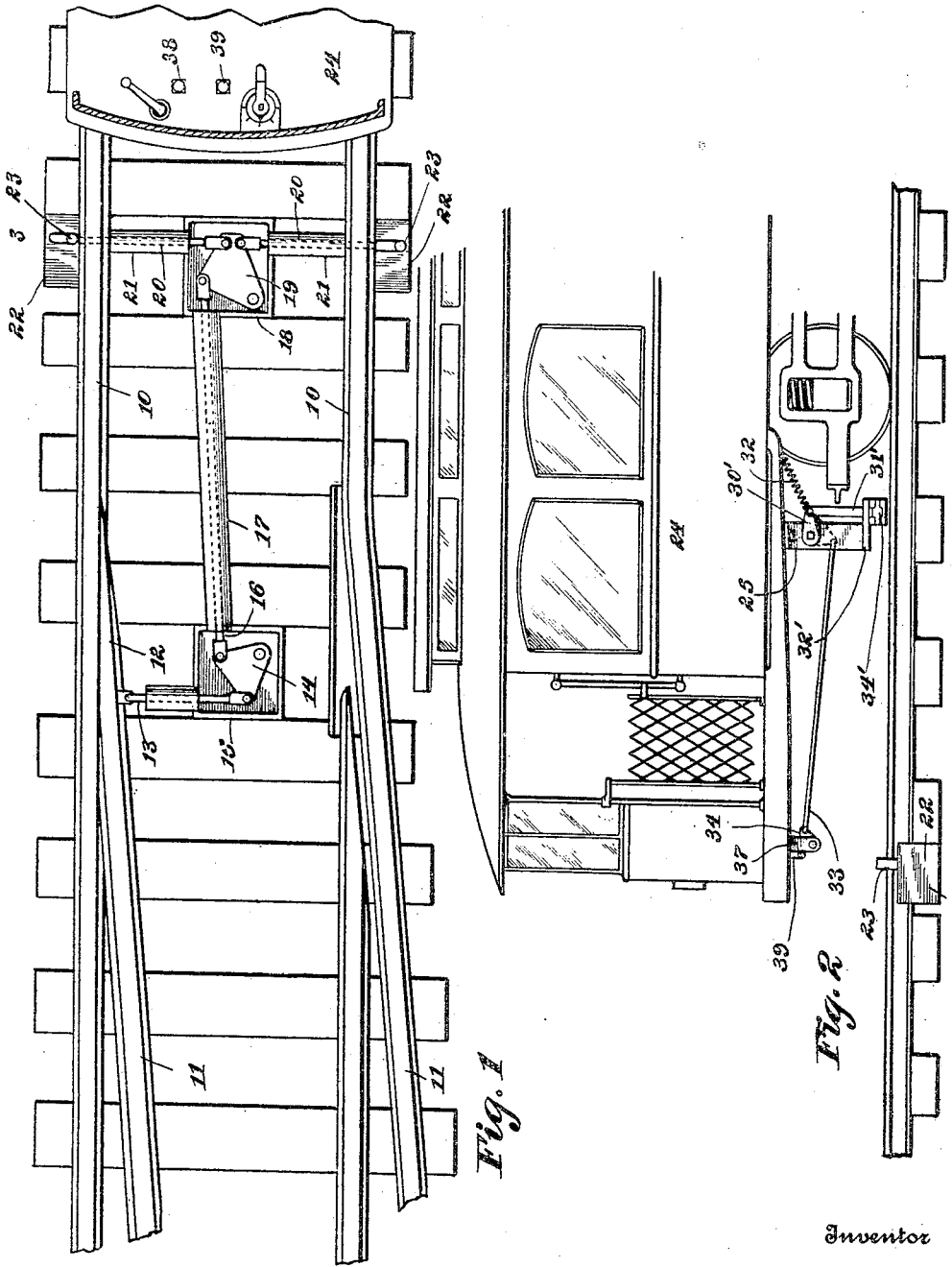
Witness
C. F. Rudolph
Inventor
Zachariah Hogan,
By Victor J. Evans
Attorney Z. HOGAN.
SWITCH OPERATING MEANS.
APPLICATION FILED SEPT. 12, 1916.
1,257,233.
Patented Feb. 19, 1918.
3 SHEETS—SHEET 2.
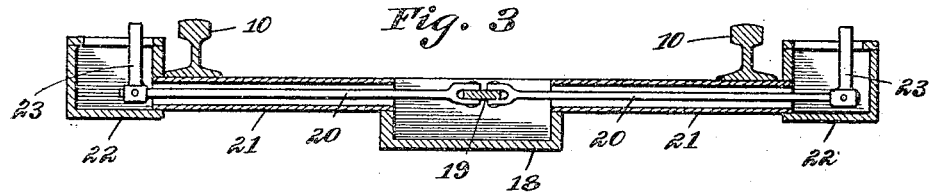
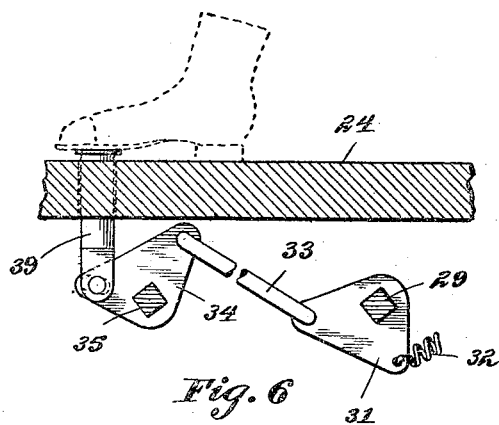
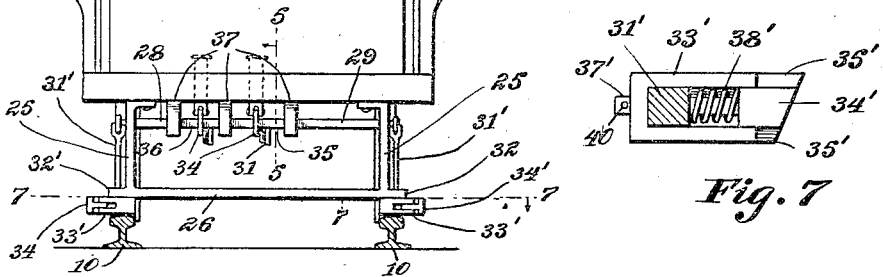
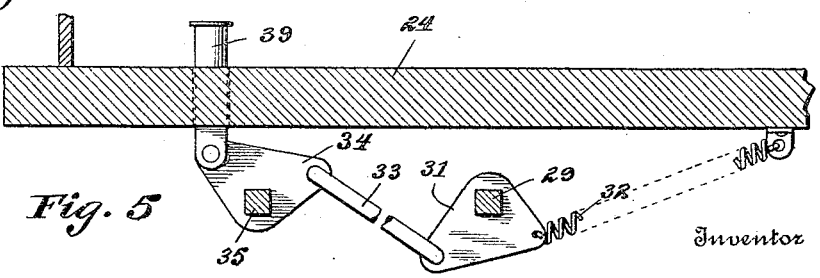
Inventor
Zachariah Hogan,
By Victor J. Evans
Attorney
Witness
C. F. Rudolph

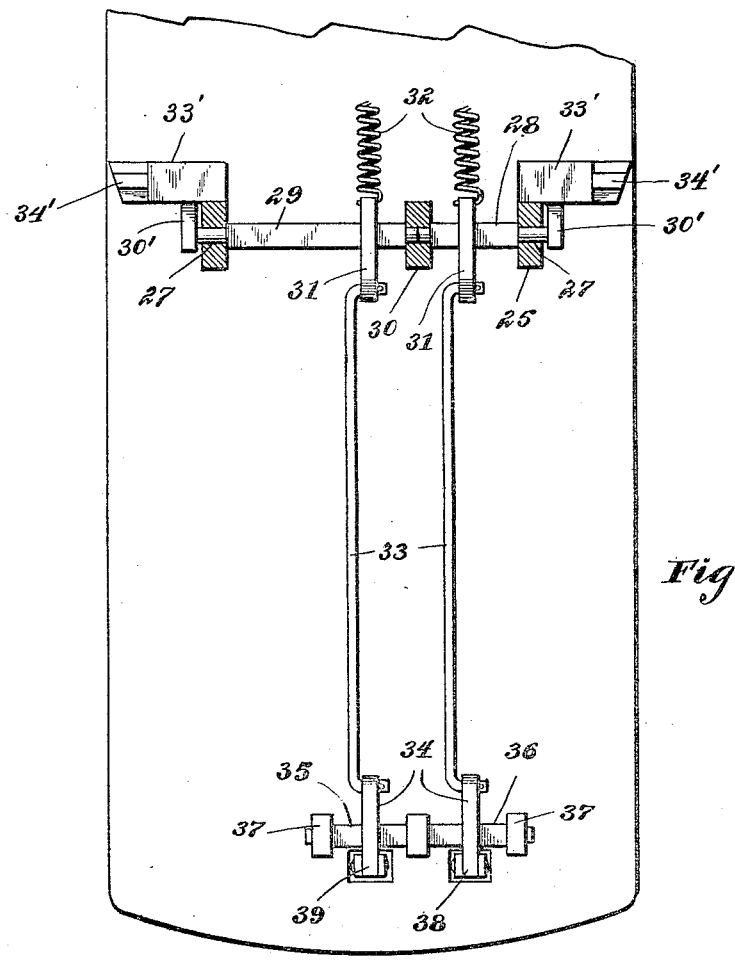
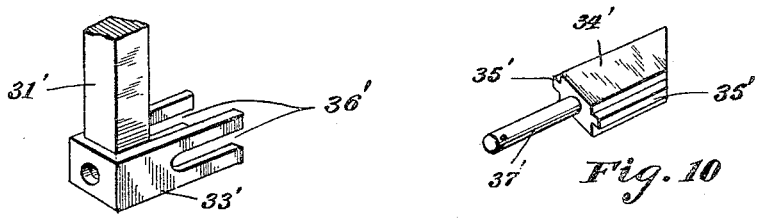

UNITED STATES PATENT OFFICE.

ZACHARIAH HOGAN, OF NEW ORLEANS, LOUISIANA.

SWITCH-OPERATING MEANS.

1,257,233.        Specification of Letters Patent.      Patented Feb. 19, 1918.

Application filed September 12, 1916. Serial No. 119,758.

*To all whom it may concern:*

Be it known that I, ZACHARIAH HOGAN, a citizen of the United States, residing at New Orleans, in the parish of Orleans and State of Louisiana, have invented new and useful Improvements in Switch-Operating Means, of which the following is a specification.

This invention relates to improvements in switch operating means and is primarily designed to provide a simple, cheap and thoroughly effective mechanism whereby the engineer or motorman of a car may readily actuate the switch by mechanism arranged in the said car so as to properly direct the car along the main or to within the siding.

With the above and other objects in view the improvement resides in the construction, combination and operative arrangement of parts set forth in the following specification and falling within the scope of the appended claims.

In the drawings:

Figure 1 is a plan view of a track having switch operating means arranged thereon constructed in accordance with the present invention and showing the forward portion of a car upon the track, Fig. 2 is a side elevation of the same, Fig. 3 is a horizontal sectional view through the casings inclosing the mechanism arranged between and to the sides of the track, Fig. 4 is a front elevation of a car illustrating the mechanism arranged thereon, Fig. 5 is a detail vertical longitudinal sectional view approximately on the line 5—5 of Fig. 4, showing the arrangement of parts when one of the foot pedal members is elevated.

Fig. 6 is a substantially similar view of the pedal in its depressed position.

Fig. 7 is a sectional view approximately on the line 7—7 of Fig. 4.

Fig. 8 is a bottom plan view of the forward portion of the car,

Fig. 9 is a perspective view of the lower end of one of the vertically disposed rods having arranged thereon the channeled shoe supporting member, and Fig. 10 is a perspective view of one of the contact members or shoes.

In the drawings, the numerals 10 designate the main rails of a track and the numerals 11 designate the rails of the siding, while 12 designates the switch point between the main and siding rails.

The switch point 12 is provided with the usual operating bar 13 which has its free end pivotally connected to a bell crank lever 14. The bell crank lever is pivotally secured in a suitable housing 15 which is disposed approximately centrally of the track and may be secured between two of the ties upon which the rails rest. The bell crank lever has pivotally secured thereto a longitudinally extending rod or link 16 which passes through an opening in one of the sides of the housing 15 and which is inclosed in a tubular casing 17, the said casing being connected between the housing 15 and a similarly constructed housing 18 which is disposed centrally between the rails of the main line at a suitable distance from the switch point and, of course, from the housing 15. Within this last mentioned housing 15 is pivotally secured a second bell crank lever 19 and the free end of the link 16 is connected with this bell crank lever 19. To the lever 19 is pivotally secured a pair of oppositely extending laterally disposed rods 20—20 that are inclosed in suitable tubular casings 21—21 and each of said casings passes below the rails of the main track and communicates with openings provided in the sides of substantially rectangular housings 22—22. The housings 22 are disposed outwardly of the rails of the main track and the ends of the rods 20—20 are disposed one within each of the said housings 22. The ends of these rods 20—20 have arranged thereon angular vertically extending fingers 23—23 and the said fingers pass through elongated openings in the top or closure member of the housings 22. The fingers 23 project a suitable distance above the housings 22 so that one of the said fingers is arranged in the path of contact with a throw element arranged upon the car whereby the switch may be operated from the car, as will now be described.

The car, as disclosed by the drawings, is adapted to be operated by an overhead conductor, but from the following it will be obvious that the switch throwing apparatus may be employed with equal efficiency upon cars having other propelling power, as well as upon locomotives if desired.

The car is indicated by the numeral 24 and while I have illustrated only one end of the car as provided with the switch throwing mechanism, it is to be understood that this mechanism may be and preferably is attached to both of the ends of the car.

The underframe of the car below the front platform thereof has secured thereto two spaced parallel downwardly extending bracket members 25—25, the said brackets, adjacent their lower ends, being preferably connected, as at 26, and each of the said brackets is provided with a transversely disposed bearing opening 27 through which passes one of the rounded ends of substantially squared shafts 28 and 29 respectively. The inner rounded ends of these shafts 28 and 29 are journaled in bearing openings provided in a member 30 that is secured to the underface of the car and that is disposed approximately centrally between the brackets 25. Upon each of the shafts 28 and 29 is secured an angularly disposed arm 31 and each of the said arms has connected thereto one end of helical springs 32, the opposite end convolutions of the said springs being secured to the underface of the car, and these springs are adapted to normally hold the shafts and arms in one position. Loosely connected with each of the arms 31 is a link member 33, the end of each of the said links being secured each to one end of an angle lever 34, and each of said angle levers is centrally connected with shafts 35 and 36 respectively. The ends of these shafts 35 and 36 are received in suitable journal bearings 37—37, three in number, the central member 37 receiving the inner ends of a pair of shafts 35 and 36. The opposite or free arm of each of the angle levers 34 has pivotally connected therewith a pedal member 38 and 39 respectively, the said pedal members passing through suitable openings in the platform of the car and being disposed preferably a slight but suitable distance inwardly of the dashboard of the car.

It will be apparent that when the motorman depresses either of the pedals 38 or 39, the shafts 35 or 36 will be rotated and these, through the medium of the links 33 will in turn rotate either of the shafts 28 or 29.

The ends of the shafts 28 and 29 which pass through the bearing openings in the brackets 25 each have arranged thereon an angular member 30', and to each of the said members 30' is pivotally connected a vertically disposed rod 31'. The rods 31' are guided through openings in angular plates 32' secured to the respective bracket members 25. To the end of each of the rods 31' is connected an angularly disposed outwardly extending channeled member 33' providing both a support and a guide for a shoe 34'. Each of the shoes 34' has its outer end disposed angularly with respect to its body and its sides provided with tongues 35' designed to be received in slots 36' in the opposite walls of the channeled member 33'. Upon its rear end, each of the shoes 34' is provided with a stem 37' that passes through alining openings in the rod 31' and the rear or closed end of the channeled member 33', connected with the said rod 31'. The outer end of the stem 37' is provided with an aperture, and the numeral 40' designates a stop member which passes through the said aperture, whereby to limit the outward movement of the shoe with respect to the channeled member 33'. Surrounding the stem 37' of each of the shoes 34' and designed to exert a tension between the inner end of the respective shoes and the rods 31' connected with the respective channeled member 33' is a helical spring 38', designed to normally project the shoe 34' outward of the respective channel or supporting members 33'.

The shoes 34' are in the nature of contact members, are normally disposed above the path of contact with the fingers 23, but are arranged so that when either of the pedals 38 or 39 are depressed, by the foot of the motorman, the said shoes will be brought into a position to contact with the said fingers. Owing to the angularly arranged active ends of the contact members or shoes either of the fingers 23 will be delivered what may be determined a wiping blow, such contact being sufficient to move the rods 30 connected with the said fingers but not to bend or injure the fingers or to inflict injury to the contact members or shoes. Should, however, the shoe be injured by constant engagement with the fingers, it will be apparent that a new contact member may be readily supplied, none of the remaining parts of the structure being subjected to other than ordinary wear.

Having thus described the invention, what I claim is:

1. A switch operating device for a car, comprising spaced shafts arranged in pairs, an angle lever secured upon each of said shafts, links connecting the respective angle levers, a foot pedal associated with two of said angle levers, spring means between the car and the angle levers for normally retaining the foot pedals in one position, angularly arranged arms on two of said shafts, a vertically disposed rod secured to each of said arms, guide means for the rods, a channeled member connected with each of said rods, and a spring pressed shoe within each of the channeled members and designed, upon the actuation of the respective foot pedals to be lowered.

2. A switch operating device for a car, including front and rear shafts arranged in pairs journaled in bearings upon the under body of the car, angle levers upon each of the shafts, links connecting each pair of angle levers, foot pedals associated with the forward pair of angle levers and with the car, for normally retaining the foot pedals in one position, an angular member connected with the respective rear shafts, a rod pivotally secured to each of the angle members, depending brackets having angular ends provided with openings through which the rods pass, an angularly disposed outwardly extending channeled member secured to each of said rods and normally designed, through the tension of the referred to springs to contact with the under face of the bracket members whereby to normally retain the same above the referred to fingers of the switch actuating means, a shoe for each of the channeled members, each of said shoes having an outer beveled end and having its sides provided with ribs received in grooves in the said channeled members, spring means for normally projecting the shoes outwardly of the channeled members, and means for limiting the outward movement of the shoes all as and for the purpose set forth.

In testimony whereof I affix my signature.

ZACHARIAH HOGAN.

Copies of this patent may be obtained for five cents each, by addressing the "Commissioner of Patents, Washington, D. C."